US009353901B2

(12) United States Patent
Dickinson

(10) Patent No.: US 9,353,901 B2
(45) Date of Patent: May 31, 2016

(54) CLOSURE MEANS FOR PIPE

(76) Inventor: Ross Dickinson, Walkerburn (GB)

(*) Notice: Subject to any disclaimer, the term of this patent is extended or adjusted under 35 U.S.C. 154(b) by 496 days.

(21) Appl. No.: 13/500,954

(22) PCT Filed: Oct. 15, 2010

(86) PCT No.: PCT/GB2010/051736
§ 371 (c)(1),
(2), (4) Date: May 15, 2012

(87) PCT Pub. No.: WO2011/045608
PCT Pub. Date: Apr. 21, 2011

(65) Prior Publication Data
US 2012/0216901 A1 Aug. 30, 2012

(30) Foreign Application Priority Data

Oct. 16, 2009 (GB) .................................. 0918168.6

(51) Int. Cl.
F16L 55/16 (2006.01)
F16L 55/17 (2006.01)
F16L 55/18 (2006.01)
F16L 55/172 (2006.01)

(52) U.S. Cl.
CPC ............. *F16L 55/1715* (2013.01); *F16L 55/16* (2013.01); *F16L 55/172* (2013.01); *F16L 55/18* (2013.01)

(58) Field of Classification Search
CPC ......... F16L 55/16; F16L 55/18; F16L 55/172; F16L 55/1715
USPC ........... 138/97–99; 285/15, 197–199; 24/170, 24/179, 316, 328
See application file for complete search history.

(56) References Cited

U.S. PATENT DOCUMENTS

| 962,566 | A | * | 6/1910 | Gerth | F16L 55/172 |
| | | | | | 138/99 |
| 1,290,041 | A | * | 1/1919 | Anderson | 138/99 |
| 1,638,269 | A | * | 8/1927 | Mullinack | 138/99 |

(Continued)

FOREIGN PATENT DOCUMENTS

| GB | 2080476 A | 2/1982 |
| GB | 2201746 A | 9/1988 |

(Continued)

OTHER PUBLICATIONS

Fromentel, Henri, "International Search Report" for PCT/GB2010/051736, as mailed Dec. 29, 2010, 5 pages.

Primary Examiner — Kevin P Shaver
Assistant Examiner — Andrew P Bainbridge
(74) Attorney, Agent, or Firm — Winstead PC

(57) ABSTRACT

A closure means for containing fluid leaking from a ruptured pipe. The closure means fits over a ruptured pipe to contain any fluid that may be leaking from the pipe. The closure means forms an enclosed cavity around the rupture in the pipe, the enclosed cavity being defined by a housing of the pipe and the pipe itself. The closure means may comprise a single housing, or may comprise two housing members. Where a single housing is used, the closure means may be applied as a patch to cover a rupture. In this embodiment, a fastening means holds the housing in sealed engagement with the pipe. Where two housing members are used, the closure means may also comprise a hinged link between the two housing members. In this embodiment, the fastening means holds the two housing members together in sealed engagement around the pipe.

14 Claims, 6 Drawing Sheets

(56) References Cited

U.S. PATENT DOCUMENTS

| | | | |
|---|---|---|---|
| 2,721,582 A | 10/1955 | Hoke | |
| 2,913,262 A * | 11/1959 | De Cenzo et al. | 285/233 |
| 3,944,260 A | 3/1976 | Petroczky | |
| 4,111,234 A * | 9/1978 | Wells et al. | 138/99 |
| 4,789,189 A | 12/1988 | Robertson | |
| 4,915,424 A | 4/1990 | Sarno et al. | |
| 5,400,477 A * | 3/1995 | Marega | A43C 11/1406 24/68 SK |
| 5,853,030 A * | 12/1998 | Walding | 138/99 |
| 6,055,707 A * | 5/2000 | Simioni | A43C 11/1413 24/68 SK |
| 6,220,302 B1 * | 4/2001 | Nolley | 138/99 |
| 8,210,210 B2 * | 7/2012 | Clark et al. | 138/99 |
| 8,701,699 B2 * | 4/2014 | Cenac et al. | 137/317 |
| 2006/0002765 A1 * | 1/2006 | Hutton et al. | 405/184.1 |
| 2008/0083101 A1 * | 4/2008 | Christian | A44C 5/246 24/71 J |

FOREIGN PATENT DOCUMENTS

| | | |
|---|---|---|
| GB | 2396678 A | 6/2004 |
| GB | 2416013 A | 1/2006 |
| WO | WO-00/02296 A1 | 1/2000 |
| WO | WO-2008065364 A1 | 6/2008 |

* cited by examiner

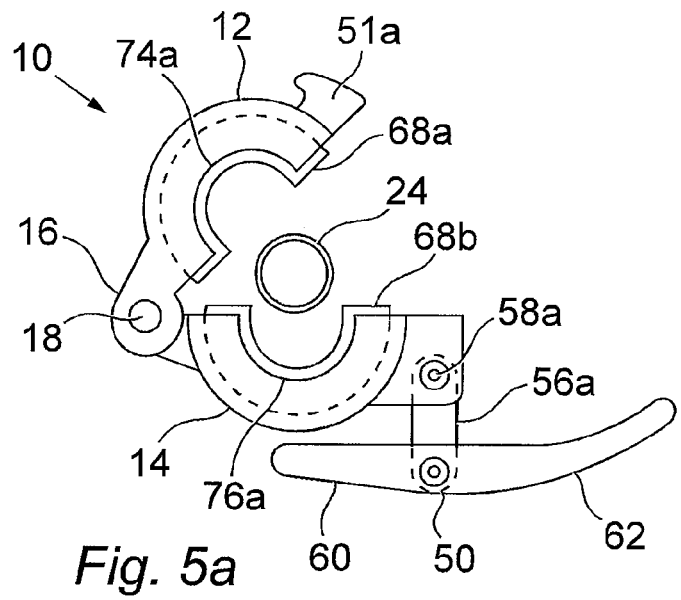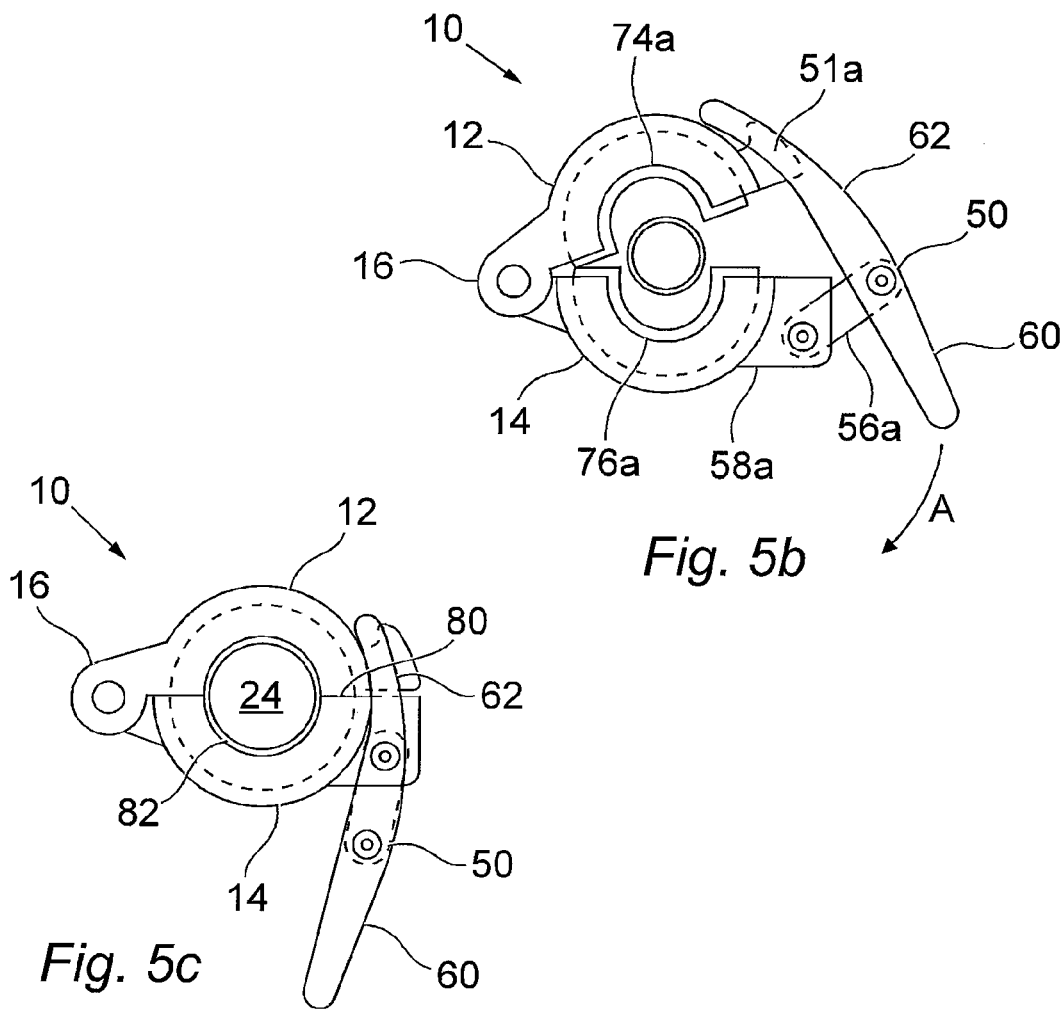
Fig. 5a
Fig. 5b
Fig. 5c

CLOSURE MEANS FOR PIPE

FIELD OF THE INVENTION

The present invention relates to the containment of leaks in pipes. In particular, the invention is related to an apparatus for use in the containment of leaks which may occur in pipework, for example in domestic plumbing.

BACKGROUND TO THE INVENTION

Pipes are a common feature of many systems in which fluids, gases or other materials are required to be transferred from one location to another. Such systems include domestic water systems, domestic heating systems and vehicle exhaust systems, vehicle fuel systems and vehicle cooling systems. Leaking or burst pipes may cause damage both to the system in which the pipe is employed and to the surrounding environment. For example, a leaking pipe in a heating system may cause a reduction in pressure and loss of water in the system, which may cause damage to a boiler. Additionally, the leaking pipe may result in water from the heating system causing significant damage to an area of a building in the proximity of the leaking.

In systems that are under pressure, e.g. a heating system or a mains water supply, it is desirable to repair a burst or leaking pipe quickly to minimise the amount of damage arising from the fluid leaking from the pipe. In certain circumstances, a temporary containment of the leak is desirable before the required steps are taken to undertake a more permanent repair. This can reduce inconvenience and loss of production.

It is typically known in the domestic plumbing field that in order to repair a leaking pipe, a sealing putty, or similar, can be used. The putty is placed over the leaking pipe to block the leaking area, or burst portion of the pipe wall. However, this repair method is limited in its use in pressurised systems as under high pressure conditions it can be difficult to place the putty over the leak and once placed in-situ, the putty may be displaced from the pipe, due to the high pressure in the pipe and therefore due to the pressure which fluid leaking from the pipe exerts on the sealing putty. In addition, the integrity of a putty seal may degrade over time as the putty ages. A repair bandage or fusion tape may be wrapped around the putty, but installing such a bandage can be cumbersome, time consuming and may require an amount of room around a pipe that may not be available if the pipe is located under floor boards, against a wall or behind cladding. In addition, the fusion tape may have a limited shelf life in that it may not be stored awaiting installation for extended periods.

SUMMARY OF THE INVENTION

According to a first aspect of the present invention there is provided a closure means for containing a fluid leaking from a pipe, the closure means comprising at least one housing suitable for placing on an outer surface of the pipe to define a cavity between the housing and the pipe, and at least one fastening means coupled to the housing, said fastening means being operable to hold the housing in sealed engagement with the pipe to produce a sealed joint therebetween.

In holding the housing in sealed engagement with the pipe, the fastening means provides a force on the housing which results in a fluid-tight seal being provided between the housing and the surface of the pipe. The production of the seal serves to contain any fluid leakage from the pipe and therefore prevents the escape of fluid, such as a gas or a liquid from out with the confines of the closure means. The cavity formed between the housing and the surface of the pipe is enclosed. That is that it allows the housing to be fitted over a section of leaking or burst pipe where the outer wall is protruding, where the diameter of the pipe has increased due to swelling or bulging, or where the exterior of the pipe is corroded. The enclosed cavity therefore serves to encapsulate the protrusion or swelling of the outer wall of the pipe and enhances the closure means with the ability to form a fluid tight seal to contain a leak.

In certain embodiments, the at least one housing may further comprise a first housing member arranged to engage or cooperate with a second housing member to close the outer circumference of a pipe. The first housing member may comprise at least one cut-away portion in an outer wall thereof and the second housing member may also comprise at least one cut-away portion in an outer wall thereof. The cut-away portions can be arranged to cooperate to define at least one aperture suitable for accommodating the outer circumference of a pipe in order to produce a sealed joint therebetween.

The use of first and second housing members allows the closure means to be fitted entirely around the outer circumference of a section of burst or leaking pipe. This provides the advantage that the closure means may be used to provide a seal around bursts, perforations or cuts which are present about a section of the circumference of a pipe, or which have resulted in a complete break, hole or cut in a pipe. The aperture defined by the recesses in the first and second housing members allows the housing to be closed over the pipe and produce the sealed joint between the pipe and the housing.

The first and second housing members may each comprise two cut-away portions, wherein the cut-away portions of the first housing member are arranged to cooperate with the cut-away portions of the second housing member to define two apertures in general register with each other in at least one wall of the at least one housing on engagement of the first housing member with the second housing member. The two apertures may be coaxially aligned for accommodating a straight length of pipe passing through both apertures.

The closure means may further comprise at least one hinge connecting the first housing member to the second housing member, wherein the first and second housing members are rotatable about the hinge. The hinge may comprise a removable hinge pin. The hinge connects the two housing members of the closure means together in order to provide an integrated device. Such an integrated embodiment of the closure means facilitates ease of use and allows a user to position and secure the closure means over a leaking pipe using only one hand. This ease of fitting the closure means is particularly advantageous when access to a leaking pipe is restricted. The removable hinge pin provides greater flexibility of operation as the closure means may be used with or without the hinge. That is to say that it may be advantageous for the closure means to comprise two separated housing members.

The at least one housing can further comprise a seal which is arranged to produce a sealed joint between the housing and the surface of a pipe. In embodiments comprising first and second housing members, the closure means may comprise a second seal located on at least one of the first and second housing members to produce the sealed joint between the first and second housing members. The first and second seals may be formed into a continuous seal.

The continuous seal may be located about the periphery of at least one of the first and second housing members to prevent fluid leakage. Forming the first and second seals into one continuous seal ensures that the sealed joint between the device and a pipe and the sealed joint between the first and second housing portions is continuous. This improves the integrity of the sealed joints. Placing the continuous deformable seal around the periphery of the housing allows the seal material to be kept away from the leak itself and consequently away from the ruptured area of a pipe. The leak may have resulted in a protruding pipe wall and/or sharp edges that may damage the seal material if they come into contact with it. By keeping the seal material away from the leak such damage may be avoided.

The first and second seals may be formed from a resiliently deformable material. The use of a resiliently deformable material allows for a better and more secure sealed joint between the closure means and a pipe, and/or between the two housing members.

The housing may have a c-shaped cross section, and may be resiliently deformable to permit closure around a section of a pipe. A device with a c-shaped cross section allows the housing to be formed in one piece and still to be fitted entirely around a section of leaking pipe. The resiliently deformable nature of the housing allows the opening formed by the c-shaped section to be increased to allow fitment around a section of pipe. Further, the resiliently deformable nature of the housing allows the opening formed by the c-shaped section to be closed around a pipe to produce a sealed joint between the housing and the pipe, and between the two opposing faces of the housing either side of the opening formed by the c-shaped section.

The fastening means may comprise a clasp closable to hold the at least one housing in sealed engagement with a pipe. The clasp may be fastened by operation of a lever. The lever may provide a camming action. The lever may be detachable. The camming action of the lever allows hand operation of the lever to produce a linear motion in a direction to produce the sealed joints from a rotational motion of the lever. This may facilitate the production of a tighter seal. A detachable lever advantageously allows removal of the lever after fitment of the closure means to a pipe. The lever will not therefore provide a hazard or interfere with other activities or equipments in the vicinity of the pipe.

The fastening means may comprise a ratchet and pawl. The ratchet and pawl may be manually operable. Alternatively, the ratchet and pawl may be tool operable. Tool operation of a ratchet and pawl may allow greater force to be applied to the fastening of the closure means when holding it in sealed engagement with a pipe. This may help form a stronger sealed joint. Additionally, in situations where a leak is under high pressure, greater fastening force may facilitate closure of the closure means.

The fastening means may comprise a locking mechanism to retain the fastening means in a fastened state. The locking mechanism prevents unintentional or unauthorised unfastening of the fastening means.

The closure means may further comprise aperture inserts, wherein the aperture inserts are configured to be inserted into the at least one aperture to vary the aperture shape and/or size to accommodate pipes of different shapes and/or diameters.

DETAILED DESCRIPTION

The present invention will now be described with reference to the following figures as described briefly below, which are provided for the purpose of illustration and are not intended to be construed as being limiting on the present invention:

FIG. 5a is a side elevation of a closure means in an unfastened configuration according to an embodiment of the invention;

FIG. 5b is a side elevation of a closure means in a partially fastened configuration according to an embodiment of the invention;

FIG. 5c is a side elevation of a closure means in a fastened configuration according to an embodiment of the invention;

Figure 1:
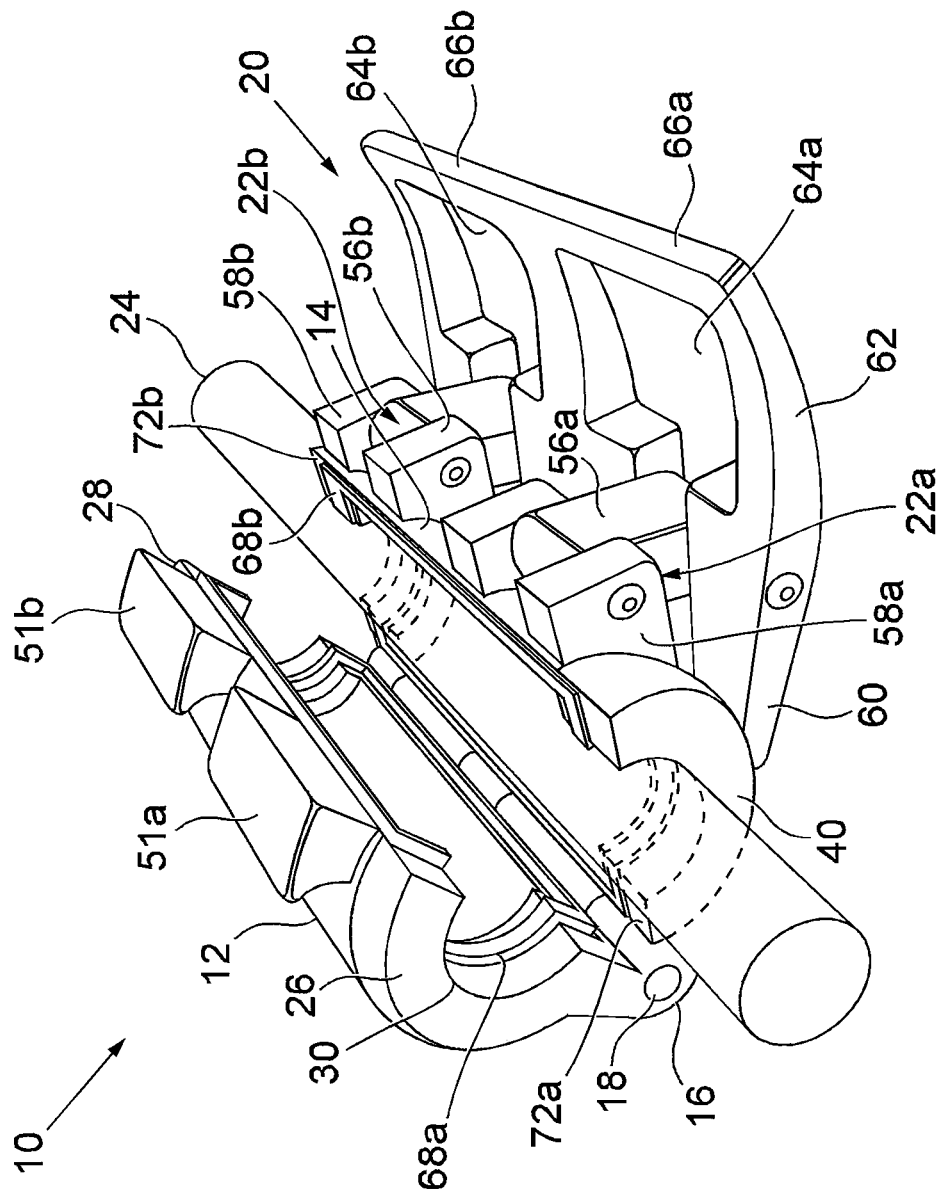
FIG. 1 is a perspective view of a closure means in an unfastened configuration according to an embodiment of the invention.

Referring to FIG. 1 there is shown a closure means 10 for containing a leak from a pipe in accordance with an embodiment of the invention. A housing of the closure means 10 is formed by a first housing member 12 and a second housing member 14. The first housing member 12 and the second housing member 14 are connected by a hinge 16. The hinge includes a hinge pin 18. A fastening means 20 is coupled to the housing by way of hinged fastening means connections 22a and 22b connecting the fastening means to the second housing member 14. The closure means 10 is shown in a partially closed position about a section of pipe 24.

It will be understood by the skilled person that the term "pipe" encompasses hoses and other fluid conduits.

In general the closure means of the invention provides an easy to use device for containing a leak from a ruptured pipe that may be cheaply manufactured. Certain embodiments of the device are entirely manually operated and can be fitted to a pipe without any training and by unskilled users. The closure means of the invention may be manufactured cheaply and provides a simple and effective method of containing a leak. These features may be particularly advantageous in poorer countries where skilled labour and/or various connections for pipework may be in scarce supply.

Figure 2:
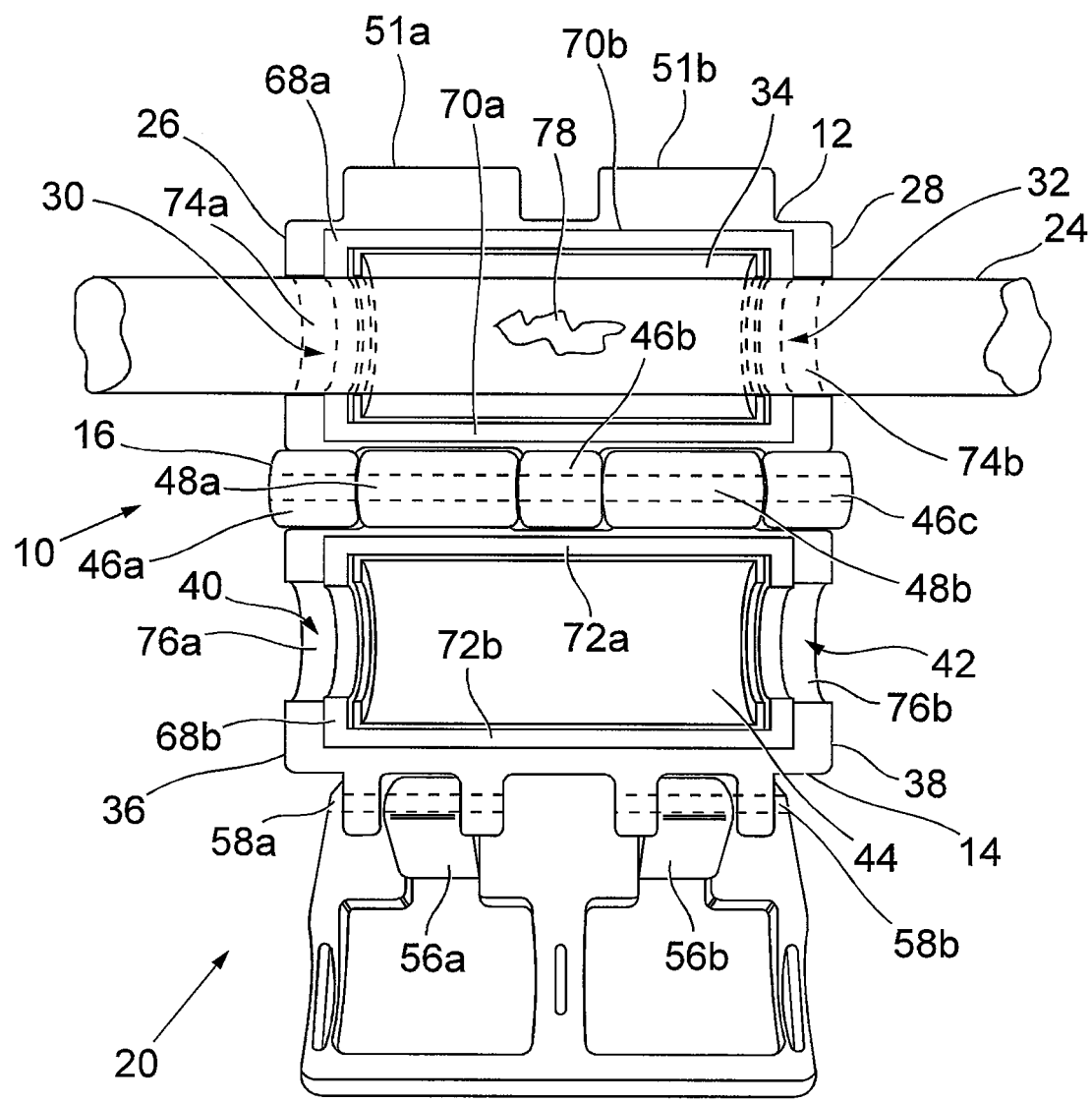
FIG. 2 is a plan view of a closure means in an unfastened configuration in accordance with the invention.

Referring to FIGS. 1 and 2, the housing is formed from first housing member 12 and second housing member 14. In the exemplary embodiment shown in FIGS. 1 and 2, the first housing member 12 and the second housing member 14 generally form two halves of a cylindrical housing. The first housing member 12 has a generally semi-circular cross section. Two end faces 26, 28 are disposed at distal ends of the first housing member 12. Semi-circular cut-away portions 30, 32 are formed in the end faces 26, 28. The cut-away portions are recesses in the walls of the end faces 26, 28. The diameter of the recesses 30, 32 is less than the internal diameter of the semi-cylindrical first housing member 12. The first housing member 12 therefore defines an internal cavity 34. The walls of the internal cavity 34 are formed by the wall of the semi-cylindrical first housing member 12 and the end faces 26, 28. The diameters of the recesses 30, 32 are configured such that they fit around a specific diameter of pipe 24 to form a sealed joint. The recesses 30, 32 may, for example, be configured to form a seal with a pipe 24 of 10 mm diameter, 15 mm diameter, 22 mm diameter or 28 mm diameter. It will be appreciated that the recesses 30, 32 may be configured to form a seal with any diameter of pipe.

The second housing member 14 is also of a generally semi-cylindrical shape. Two end faces 36, 38 are disposed at distal ends of the second housing member 14. Semi-circular cut-away portions 40, 42 are formed in the end faces 36, 38. The cut-away portions are recesses in the end faces 36, 38. The diameter of the recesses 40, 42 is less than the internal diameter of the semi-cylindrical second housing member 14. The second housing member 14 therefore defines an internal cavity 44. The walls of the internal cavity 44 are formed by the wall of the semi-cylindrical second housing member 14 and the end faces 36, 38. The diameters of the recesses 40, 42 are configured such that they fit around a specific diameter of pipe 24 to form a sealed joint. The recesses 40, 42 may, for example, be configured to form a seal with a pipe 24 of 10 mm diameter, 15 mm diameter, 22 mm diameter or 28 mm diameter. It will be appreciated that the recesses 40, 42 may be configured to form a seal with any diameter of pipe.

The skilled person will appreciate that the first and second housing members 12, 14 may be formed into various shapes and sizes to suit different applications.

In some embodiments, aperture inserts may be placed inside the cut-away portions of the first and second housing members. The inserts have cut-away portions formed within them that have the effect of changing the shape and/or size of the apertures to accommodate different shapes and sizes of pipe.

The housing may be formed of clear plastics material. Alternatively, the housing may comprise a transparent window. This allows the ruptured pipe to be viewed before repair when the closure means 10 is fitted.

In some embodiments, the closure means may be formed of "intelligent plastics", e.g. such as thermachromic plastics that change colour when heated. In some embodiments the housing may be formed from heat shrinkable plastics that shrink when heat is applied to them. In some further embodiments the housing may be formed from shape memory polymers; electrically active polymers, carbon, carbon composites or luminescent materials (that "glow" in the dark).

The housing may, for example, be manufactured from: a 30% glass reinforced nylons (polyamide) such as R530H; a 35% glass reinforced nylons (polyamide) such as Zytel®; or acetal (POM) co-polymers such as Hostaform® C9021 or Hostaform® C2521. The housing may also be manufactured from metals such as steel, cast iron stainless steel or metal alloys.

The housing may have greater or less rigidity dependent on the required function. For containing low pressure leaks, a more flexible housing may be manufactured, which may reduce production costs. Alternatively, for specialist high pressure systems such as the water mains, hydraulic pipework or air lines, the housing may be more rigidly constructed.

The closure means 10 includes a hinge 16 that rotatably connects the first housing member 12 to the second housing member 14. Three hinge lugs 46a, 46b, 46c are formed on an outer surface of the first housing member 12 and extend radially outward from the semi-cylindrical wall of the first housing member 12. The hinge lugs 46a, 46b, 46c are equally spaced along the longitudinal axis of the closure means 10. Hinge lugs 46a and 46c are located at opposing ends of the first housing member 12, and hinge lug 46b is located halfway along the axial length. Co-axial cylindrical channels are formed in each of the hinge lugs 46a, 46b and 46c in the direction of the longitudinal axis of the closure means such that the hinge pin 18 may be inserted through all three hinge lugs 46a, 46b, 46c.

Two corresponding hinge lugs 48a, 48b are formed on the outer surface of the second housing member 14 and extend radially outward from the semi-cylindrical wall of the second housing member 14. The hinge lugs 48a, 48b have co-axial cylindrical channels formed through them in the direction of the longitudinal axis of the closure means 10 such that a hinge pin 18 may be inserted through the hinge lugs 48a, 48b.

The hinge lugs 48a, 48b are interleaved with the hinge lugs 46a, 46b, 46c such that the channels formed in all hinge lugs formed on the first and second housing members 12, 14 are aligned. The hinge pin 18 is inserted through the channels formed in all hinge lugs 46a, 46b, 46c, 48a, 48b such that a hinge is formed whereby the first housing member 12 is rotatable about the axis of the hinge 16 formed by the hinge pin 18.

An exemplary embodiment of a hinge has been described above. However, it will be appreciated that, as used herein, the term hinge encompasses any mechanism for allowing a rotational movement between at least two hinged elements, e.g. the first housing member 12 and the second housing member 14. A hinge may, for example, comprise a hinge pin and barrel assembly as depicted in FIGS. 1, 2 and 5a to 5c. Alternatively, a hinge may be a "living hinge" in which the hinge and the hinged elements are formed from the same piece of material, e.g. moulded plastics. In such an arrangement the hinge is often formed of a thinner piece of moulded plastics allowing rotation of the hinged elements.

The hinge may also be extendable such that the closure means 10 may be used in conjunction with larger diameter pipes. Any other variety of hinge is also intentionally encompassed. In some embodiments of the invention, the hinge may include a biasing means connected to the first and second housing members 12, 14 to bias the closure means in a closed position. The biasing means may be a spring.

Figure 3:
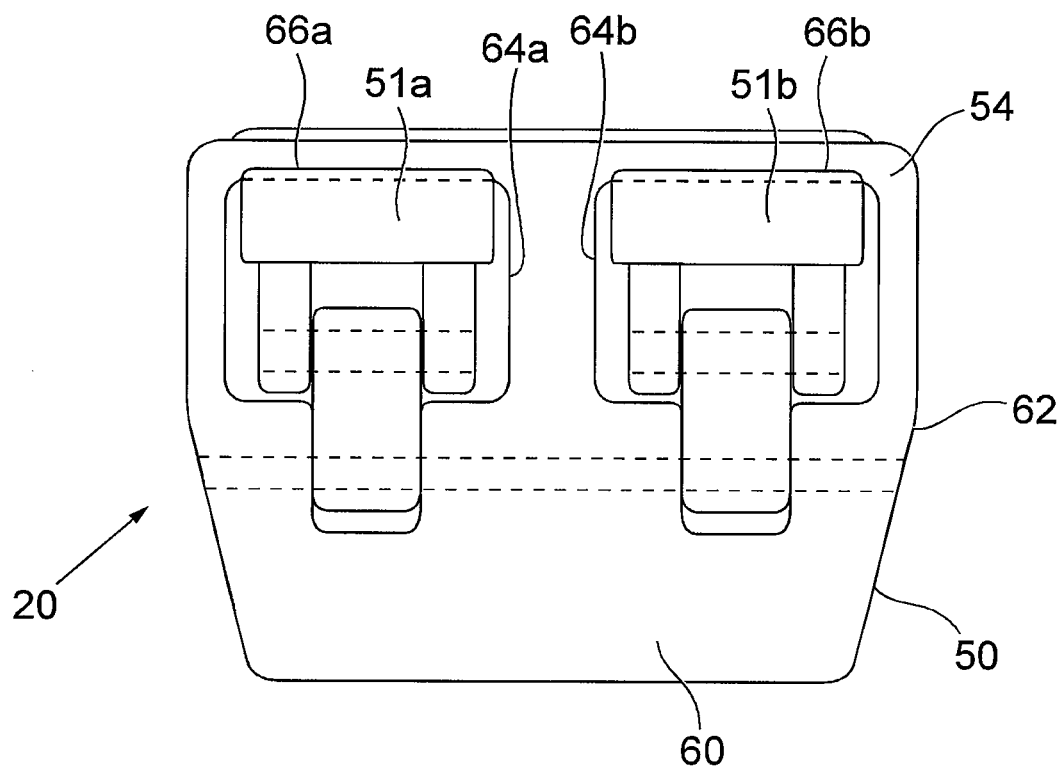
FIG. 3 is a front elevation of a closure means showing a fastening means according to an embodiment of the invention.

Referring in particular to FIG. 3, the fastening means 20 is a clasp. The fastening means 20 includes a clasp arm 50, which is coupled to the second housing member 14, and is operable to engage with two clasp arm engagement lips 51a, 51b formed on the first housing member 12.

Two clasp arm retaining lugs 58a, 58b are formed on the second housing member 14 extending radially opposite the hinge lugs 48a, 48b. Two linkages 56a, 56b are pivotally connected to the clasp arm retaining lugs 58a, 58b. The two linkages 56a, 56b are further pivotally connected to the clasp arm 50 at a point substantially halfway along the length of the clasp arm 50.

The clasp arm 50 is split into two portions: a lever 60 extending in a direction away from the pivotal connection with the linkages 56a, 56b; and a clasp latch 62 extending in a direction substantially opposite to the direction of the lever 60. The clasp arm 50 is pivotally connected to the linkages 56a, 56b such that the lever 60 is of sufficient length to allow the closure of the clasp.

The use of the lever allows for large forces to be exerted when closing the closure means 10. It will be appreciated that the length of the lever 60 may be increased to provide greater leverage or rotational force, or decreased to provide less rotational force as required by varying the position of the pivotal connection with the linkages 56a, 56b. In this way the closure means is advantageously designed to be closable using one hand.

In some embodiments of the invention, the lever 60 may be detachable. This allows a lever of longer length, which is capable of generating greater torque and leverage, to be used to operate the fastening means 20 as the lever may be detached after use and so will not be a hindrance to other activities or equipments in the vicinity of the pipe.

The lever 60 has a generally planar or rectangular face extending in a longitudinally axial direction of the closure means 10. The rectangular face provides a large contact surface to contact with a user's hand when operating the clasp. The lever 60 is orientated relative to the clasp latches in order to facilitate closure of the closure means.

In some embodiments of the closure means, the lever may include information important to the maintenance or repair of the system to which the closure means is fitted, or the closure means itself. The lever may, for example, include the date on which the rupture in the pipe occurred, the date on which the closure means was fitted to the pipe, or information regarding the fluid contained in the system.

The clasp latch 62 has two latch apertures 64a, 64b formed therethrough. The latch apertures 64a, 64b are equally spaced along the length of the clasp latch 62 in the direction of the longitudinal axis of the closure means 10. The latch apertures 64a, 64b form two latch bars 66a, 66b along an outermost edge of the clasp latch 62, which are arranged to fit over the clasp arm retaining lips 51a, 51b.

In other embodiments the clasp latch 62 may comprise a single land formed with a clasp latch retaining lip along an edge distal the linkages 56a, 56b. In these embodiments the clasp latch 62 may comprise no apertures. The latch retaining lip corresponds to the clasp arm retaining lips 51a, 51b and is arranged for interengagement therebetween. A clasp latch 62 with no apertures may provide increased rigidity and durability.

In other embodiments, the fastening means 20 may be constructed using alternative techniques. For example, the fastening means may be a ratchet and pawl system, or the like. The ratchet may be a linear ratchet connected to one of the first and second housing members 12, 14. The pawl may be connected to the other of the first and second housing members 12, 14. The ratchet and pawl may be manually operated by inserting the linear ratchet through the pawl. Pressure applied to close the closure means will engage the elements of the linear ratchet with the pawl to retain the closure means in a closed state and prevent it from becoming unfastened. This operation is analogous to the operation of a pair of handcuffs, or of a zip-tie.

In some embodiments the ratchet and pawl may be hand operated. That is to say that the ratchet and pawl may function to close the closure means when the first and second housing members are brought together manually. This action may be provided by a user of the closure means with one hand, i.e. the first and second housing members may be closed together with one hand to engage the ratchet and pawl.

In other embodiments the ratchet and pawl system may also be tool operated. For example a ratchet handle may be attached to a ratchet and pawl mechanism located on the housing of the closure means, operation of the handle tightening the closure of the device. In such embodiments the fastening means may include a release mechanism. The release mechanism may, for example, be a push-button release mechanism to quickly release the fastening means and allow rapid removal of the closure means.

In other embodiments, the fastening means 20 may be a jubilee clip style fitment, or the like, comprising a band fitted around the entire housing, which may be tightened to hold the closure means in a sealed engagement with a pipe.

It will be appreciated that other types of fastening means could also be used.

End faces and semi-cylindrical walls of the first housing member 12 define contact surfaces 70a, 70b. End faces 36, 38 and semi-cylindrical walls of the second housing member 14 define contact surfaces 72a, 72b. The contact surface 70a is arranged to meet the contact surface 72a when the first and second housing members are engaged and the closure means 10 is closed about a length of pipe 24. The contact surface 70b is arranged to meet contact surface 72b when the first and second housing members are engaged and the closure means 10 is closed about a length of pipe 24.

The recesses or cut-away portions 30, 32 of the first housing member 12 form contact surfaces 74a, 74b. The recesses or cut-away portions 40, 42 of the second housing member 14 form contact surfaces 76a, 76b. The contact surfaces 74a, 74b, 76a, 76b are arranged to meet an external surface of a pipe 24 when the first and second housing members are engaged and the closure means 10 is closed about a length of pipe 24.

The contact surfaces 70a, 70b, 72a, 72b, 74a, 74b, 76a, 76b defined above extend around the periphery of the internal cavities formed by the end faces and the semi-cylindrical walls of each of the first and second housing members 12, 14. Each of the contact surfaces defined above is fitted with a seal. FIGS. 1 and 2 show a seal 68a fitted to the first housing member 12 and a seal 68b fitted to the second housing member 14. In the exemplary embodiment shown in FIGS. 1 and 2 the seals 68a, 68b each form a single continuous seal fitted along each of the contact surfaces of each housing member. In alternative embodiments the seal 68a may comprise separate seals fitted along contact surfaces 70a, 70b and contact surfaces 74a, 74b. Additionally, seal 68b may comprise separate seals fitted along contact surfaces 72a, 72b and contact surfaces 76a, 76b. In other embodiments only one of the first and second housing members 12, 14 is fitted with a seal.

In yet further embodiments, the first housing member 12 and/or the second housing member 14 may be fitted with more than one continuous seal. For example a first continuous seal may be fitted radially inside a second continuous seal relative to the periphery of the enclosed cavity. Further, each of the first and second continuous seals may be formed of separate materials.

The seals 68a, 68b are fitted around the periphery of the first and second housing members respectively. Additionally, the seals 68a, 68b are fitted around the periphery of the internal cavity defined by each of the first and second housing members. This is achieved by fitting the seals 68a, 68b on the contact surfaces defined by the end faces and the semi-cylindrical walls of the first and second housing members. Placing the seals at the edges of the first and second housing members and at the edges of the internal cavities of the first and second housing members keeps the seals 68a, 68b away from the location on a pipe where a leak may have occurred. This is advantageous as any sharp or protruding edges of the pipe wall caused by the generation of a leak do not come into contact with the seals 68a, 68b and are therefore not able to damage the seals 68a, 68b.

Figure 4:
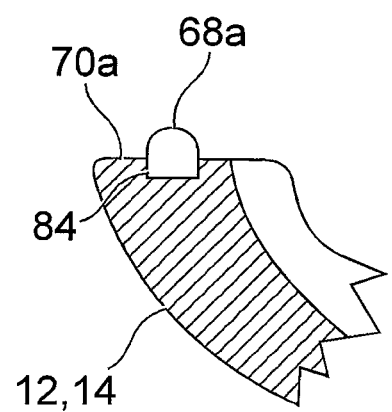
FIG. 4 is a partial section through a housing and seal of a closure means according to an embodiment of the invention.

Referring to FIG. 4, the seal 68a is shown. The seal 68a is exemplary only and the same methods of fixing used for the seal 68a may be applied to any other seals used in the closure means 10. The seal 68a is inserted into a channel in the contact surface 70a. The seal 68a may be inserted into the channel 84 by injection. The seal extends from the contact surface 70a. The seal 68a is manufactured from a resiliently deformable material such that compression of the seal 68a under the force applied by the fastening means 20 aids in the forming of a seal and maintains seal integrity.

The seal 68a may be manufactured using: polyether-ester elastomer (TPE-E) such as Arnitel®; or thermoplastic vulcanizate (TPV) such as Santopene®.

In other embodiments the seal 68a may be formed on the contact surface 70a. In other embodiments the seal 68a may be formed integrally as part of the contact surface 70a. In further embodiments the seal 68a may form a "tongue-andgroove" arrangement, wherein a male portion of the seal 68a (the tongue) formed on one of the first or second housing members 12, 14 interacts with a female portion of the seal (the groove) formed on the other of the first or second housing members 12, 14.

In some embodiments, the seal 68a may be removable. A removable seal allows replacement of the seal for different uses of the closure means 10. For example, if a system contains steam or hot fluids then a seal may be fitted that will have a high resistance to heat. Also, if a high pressure system is encountered then a more rigid seal may be used.

In some embodiments, the seal 68a may be formed from water-expandable polymers. The seal may be formed, for example, from a urethane polymer that when water touches the surface of the polymer, water molecules arrange themselves predictably around each polymer molecule until the polymer is "full" of water. Such materials are marketed, for example, by Industrial Polymers Incorporated.

In other embodiments the seal 68a may be made from a setting material such as a silicone based sealant or a resin. This may provide a more permanent repair to contain any fluid leaking from a ruptured pipe.

In yet further embodiments the seal may be formed to provide an electrofusion fitting in that an electrical current is used to fuse the seal to the surface of a pipe.

In further embodiments, the contact surfaces 74a, 74b, 76a, 76b of the cut-away portions or recesses 30, 32, 40, 42 have formed thereon teeth protruding radially inward from the contact surface. The teeth are adjacent the seal and contact an outer surface of the pipe when the closure means is in a closed position. The teeth are positioned such that they do not interfere with or hinder the production of a sealed joint between the seal and the pipe. The teeth bite into the outer surface of the pipe to prevent rotational and longitudinal movement of the closure means 10 when in a closed position about the pipe providing greater surety of sealed engagement. Greater surety of sealed engagement is particularly beneficial when the closure means 10 is used in conjunction with gas pipes, steam pipes, hydraulic pipes, chemical pipes or, more generally, any pipe system in which leakage may be harmful or dangerous.

The use of teeth on the contact surfaces 74a, 74b, 76a, 76b of the cut-away portions or recesses 30, 32, 40, 42 also aids in the closure of the closure means 10 as the biting action of the teeth resists the rotational force applied to the closure means 10 when the fastening means 20 is operated (see below for operation of fastening means 20).

Referring to FIGS. 2 and 5a to 5c the operation of the closure means 10 will be described. FIG. 2 shows the closure means 10 in a fully open configuration. FIG. 2 also shows a pipe 24, which has been ruptured and has a hole 78 causing a leak. The closure means 10 is positioned such that the contact surfaces 72a, 72b, 76a, 76b are located either side of the hole 78. This ensures that any fluid, gas or other material leaking from the hole 78 will be retained within the internal cavities of the first and second housing members 12, 14 when the closure means 10 is secured around the pipe 24.

As shown in FIG. 5a, the closure means 10 is closed around the pipe 24 by the relative rotation of the first and second housing members 12, 14 about the hinge 16. FIG. 5b shows the clasp arm 50 moved in a direction toward the first housing member 12 and the clasp arm engagement lips 51a, 51b via the pivotal connections to the linkages 56a, 56b and the clasp arm retaining lugs 58a, 58b. The clasp engagement lips 51a, 51b pass through the latch apertures 64a, 64b such that the latch bars 66a, 66b are hooked over the clasp engagement lips 51a, 51b to engage therewith.

FIG. 5b shows the closure means 10 in an initial closed position. In this configuration the closure means 10 is prevented from opening by the engagement of the latch 62 with the clasp engagement lips 51a, 51b, but the clasp is not in a fully closed position to hold the closure means in sealed engagement with the pipe 24. Therefore the closure means 10 may be moved along the length of the pipe 24. This is advantageous in circumstances of a high pressure leak. In such conditions it may be problematic to close the closure means 10 around the leak in the pipe as the high pressure leak may apply a force to keep the closure means 10 open. Advantageously, the closure means 10 may be placed in the initial closed position at a location along the pipe 24 away from the leak. The closure means 10 may then be slid along the pipe 24 such that the hole 78 is positioned between the ends of the closure means. The high pressure leak will not be able to open the closure means 10 due to the engagement of the latch 62 with the clasp engagement lips 51a, 51b. Additionally, the flow of fluid from the leak may pass over the seals of the closure means clearing them of debris and improving the integrity of the sealed joint once the closure means is fully closed.

An alternative to the initial closed position shown in FIG. 5b is to place the housing formed by the first and second housing portions 12, 14 on a section of pipe such that an enclosed cavity is formed between the housing and the surface of the pipe 24. The cavity is formed by the two internal cavities defined by the first and second housing members 12, 14. The cavity therefore forms an annulus around the pipe 24. By defining the cavity around the pipe, the closure means 10 is able to be placed around leaking pipes in which the leak has resulted in an outwardly protruding pipe wall or swollen pipe diameter without a loss in seal integrity. Additionally, any protrusion in the wall of the pipe does not contact the closure means 10 and is therefore not able to cause any damage to it.

The recesses 30, 32 of the first housing member 12 cooperate with the recesses 40, 42 of the second housing member 14 to form apertures in the housing. The apertures are located at distal ends of the closure means 10. The apertures are in general register with each other. The apertures are coaxially aligned to allow a straight length of pipe 24 to pass through each aperture.

In further embodiments the closure means may be formed to accommodate pipes that include a bend or a T-shaped junction. Using these embodiments of the closure means, leaks from pipe ruptures at or near a bend or junction may be contained.

Figure 6:
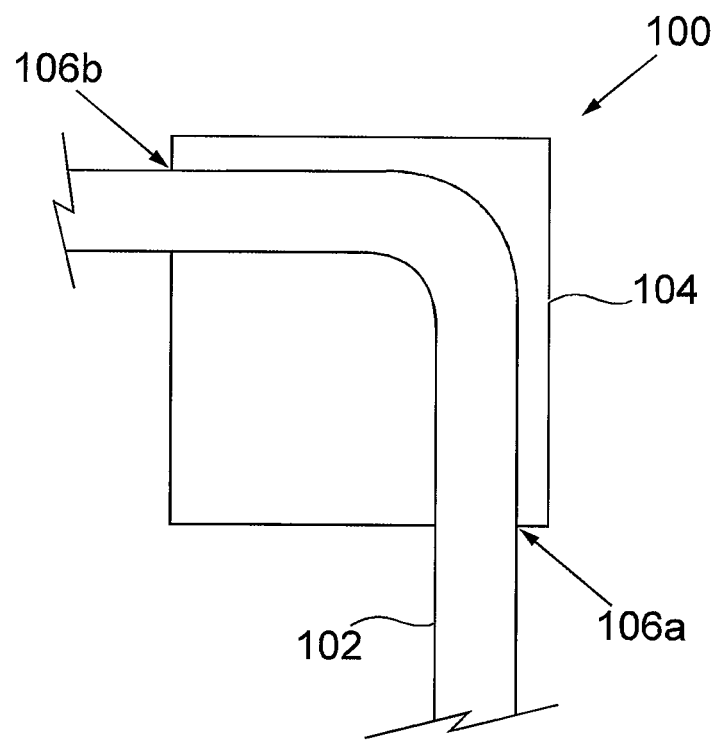
FIG. 6 is a cross section through a closure means according to an embodiment of the invention fitted around a portion of a pipe comprising a bend.

As shown in FIG. 6, a closure means 100 may form an enclosed cavity that encompasses a bent pipe 102. FIG. 6 shows a cross section through a complete housing 104 and a bent portion of pipe 102. The bent portion of pipe in FIG. 6 is illustrative only. The skilled person will understand that bends in certain pipe systems, for example domestic plumbing, are created using a specific fitting not shown in FIG. 6. As in other embodiments, the housing 104 comprises first and second housing members, but these are not shown in the figure. The housing 104 is rectangular in shape and is of a size sufficient to enclose the bent portion of pipe 102. The first and second housing members may be in hinged connection with each other along any of the edges of the rectangular cross section. The skilled person will understand that the complete housing 104 may have any cross section suitable for enclosing the portion of bent pipe. The first and second housing members may be closed around the bent portion of pipe in a manner similar to other embodiments of the invention to form two apertures 106a, 106b. The two apertures 106a, 106b are formed in a wall of the housing. The apertures 106a, 106b are not coaxially aligned. The apertures are positioned and aligned relative to one another to accommodate the bend in the pipe. The bend may be a ninety degree bend, a less than ninety degree bend or a greater than ninety degree bend.

Figure 7:
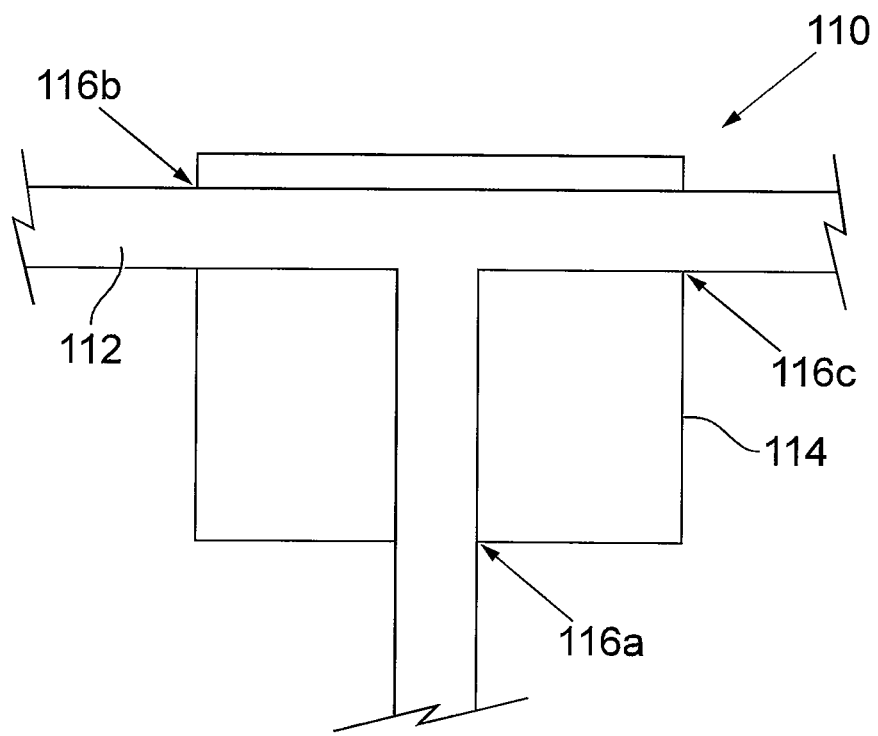
FIG. 7 is a cross section through a closure means according to an embodiment of the invention fitted around a portion of a pipe comprising a T-shaped junction.

As shown in FIG. 7 a closure means 110 may be alternatively arranged to accommodate a T-shaped junction in a pipe 112. As in the embodiment of FIG. 6, a housing 114 has a rectangular cross section and comprises first and second housing members that are not shown in FIG. 7. In the arrangement of FIG. 7, the first and second housing members are closed about a T-shaped junction in a pipe 112 to form three apertures 116a, 116b, 116c. The T-shaped junction in FIG. 7 is illustrative only. The skilled person will understand that T-shaped junctions in certain pipe systems, for example domestic plumbing, are created using a specific fitting not shown in FIG. 7. One aperture is formed to accommodate each leg of the pipe leading into the T-shaped junction. Two of the apertures 116b, 116c are coaxially aligned. The third aperture 116a is aligned in a direction substantially transverse to the coaxial alignment of the other two apertures.

The closure means may also be arranged to accommodate any other variation of pipe bend or junction. In addition, the closure means may be arranged to comprise apertures of different sizes such that different sized pipes may be joined using the closure means, each pipe passing through a correspondingly sized aperture. In such arrangements, the outer wall of the first and second housing members may be tapered to provide end faces of the housing sized to accommodate apertures of the required diameter.

In yet further embodiments, the closure means may include only a single aperture. In this arrangement the closure means may be used in conjunction with a broken or cut off pipe to contain leaking fluid from the end of the pipe. The embodiment of e.g. FIGS. 1 and 2 may be adapted in that an aperture insert may be inserted into the cut-away portions or recesses of the first and second housing members to close off one of the apertures.

Referring to FIG. 5c, once the closure means 10 has been placed about the pipe 24, the fastening means 20 may be operated to hold the closure means 10 in sealed engagement with the pipe 24 and to produce a sealed joint between the pipe 24 and the housing, and between the first and second housing members 12, 14.

The term sealed joint as used herein encompasses any style of joint between two members that forms a seal. The term seal is intended to encompass any join between two members that is capable of retaining a substantial proportion of a fluid under pressure. In embodiments the seal of the sealed joint is sufficient to contain a fluid, gas or other material escaping from a ruptured pipe. Different leaks may be under different pressures. As such, in different embodiments the seal should be able to withstand different pressures. In particular, in various embodiments the seal may be configured to withstand pressures up to 3 bar for a domestic heating system, up to 10 bar for a mains water system or up to 20-25 millibar for gas systems. In addition, in various embodiments the seal may be configured for use in air hoses or hydraulic hoses. The sealed joint may be formed by a resiliently deformable seal fitted to at least one of the members. The resiliently deformable seal may be formed on the at least one member. Alternatively, the resiliently deformable seal may be injected into a channel formed in the at least one member. The joint may be formed by two surfaces butted against one another. Alternatively, the joint may comprise a channel or recess formed in a first member into which a protrusion formed on a second member is fitted. The joint may be made using members manufactured from a resiliently deformable material.

In certain embodiments, the closure means 10 may be moved in a direction along the length of the pipe 24 when the fastening means 20 has been operated to hold the closure means 10 in a sealed engagement with the pipe 24. In other embodiments, the closure means 10 may be rotated around the pipe 24 when the closure means 20 has been operated to hold the closure means 10 in a sealed engagement with the pipe 24. This allows repositioning of the closure means 10 even when it is in the closed position.

Operation of the fastening means 20 is effected by moving the lever 60 in a direction away from the clasp arm retaining lips to pull the first housing member 12 toward the second housing member 14. Once linkages 56a and 56b are beyond a critical point (horizontal in FIG. 5b), movement of the lever 60 is in the direction of arrow A (FIG. 5b). This movement is defined by the length of linkages 56a and 56b as they pivot about the pivotal connection on clasp arm retaining lugs 58a and 58b respectively. Movement of the lever 60 in the direction A therefore locks the first housing member 12 and the second housing member 14 in a fixed engagement. The lever 60 is therefore a pivot linkage that applies a force to the first and second housing members 12, 14 to hold them together.

The force applied to the first and second housing members 12, 14 moves the first and second housing members 12, 14 toward each other and holds them together to form a sealed joint therebetween. Additionally, the force applied may be described as a provided by a camming action in that a linear force is applied to the first and second housing members 12, 14 from a rotational motion of the lever 60. The force applied to the fastening means 20 holds the first housing member contact surfaces 74a, 74b and the second housing member contact surfaces 76a, 76b in contact with an external surface of the pipe 24 to form a sealed joint therebetween. The outer surface of the housing and the fastening means may be of an anti-slip nature to aid gripping of the device when closing the closure means 10 in wet environments.

The closure means 10 is released from a pipe 24 to which it has been fitted by operation of the fastening means 20 in a direction opposite to direction A (FIG. 5b). This action releases the clasp arm 50 from the clasp arm engaging lips 51a, 51b. The clasp arm 50 is then free to be removed from engagement with the first housing member 12. The closure means 10 is then opened and removed from the pipe 24.

The outer surface may also include protrusions that aid the user when closing the closure means 10. The protrusions may be, for example, finger mouldings on an outer surface of the closure means 10. In embodiments of the invention in which the housing and lever are too large to be held in a user's hand, the finger mouldings may be located on the outside of the housing in a position to allow one-handed operation. More specifically, the finger mouldings may be placed at a distance from the lever such that the base of a user's palm may be placed on the lever and the user's fingers may engage with the finger mouldings in order that the invention is operable on closure of the user's hand.

In certain embodiments, magnetic strips may be used to provide a magnetic attraction between the first and second housing members to aid closing of the closure means. The magnetic strips may be placed on the contact surfaces 70a, 70b, 72a, 72b, 74a, 74b, 76a, 76b. Alternatively, the magnetic strips may be placed beneath the surface of the contact surfaces at a depth suitable to allow sufficient magnetic force to be applied to the first and second housing members.

In the embodiments described above, the closure means 10 is operated manually, without the need for any tools.

FIG. 5c shows the closure means 10 in a closed position. A housing member sealed joint 80 is formed between the first and second housing members 12, 14.

A pipe sealed joint 82 is formed between the first and second housing members 12, 14 and the pipe 24.

When the closure means 10 is in the fully closed position a locking means (not shown) may be activated to retain the fastening means 20 in its closed state. The locking means may be e.g. in the form of a key and lock. By locking the fastening means 20 in a closed state unintentional or malicious operation of the closure means 10 may be avoided.

Figure 8:
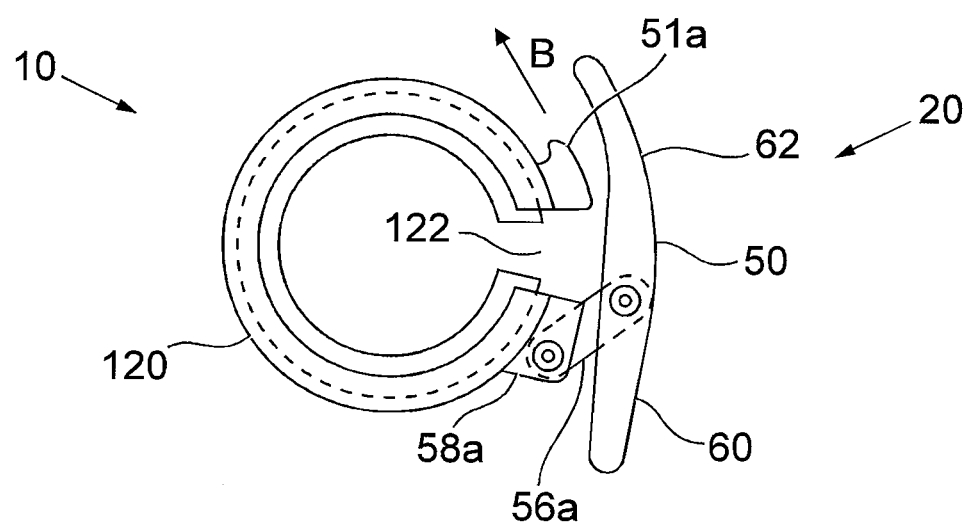
FIG. 8 is a side elevation of a closure means in an unfastened configuration according to an embodiment of the invention.

Referring to FIG. 8 there is shown a closure means 10 according to an alternative embodiment of the invention. The housing is formed from a single housing member 120. The single housing member is of a generally cylindrical shape, with a c-shaped cross section to form an opening 122. The function of the fastening means 20 is the same as described for the embodiments shown in FIGS. 1 to 5 and is therefore not described again here. The single housing member 120 is formed from a resiliently deformable material. In some embodiments the single housing member may comprise reinforcing steel radials located within the resiliently deformable material.

In use, the opening 122 is enlarged by applying a force to the single housing member 120 in the direction of arrow B. The elastic property of the resiliently deformable material of the single housing member 120 allows the opening 122 to be enlarged and to return to its original size when the force is removed. In this way, the opening 122 may be sufficiently enlarged to fit over a pipe (not shown). The closure means 10 may therefore be placed around a pipe about a leak. The fastening means 20 may then be operated in the same way as depicted in FIGS. 5a to 5c to hold the closure means 10 in a sealed engagement with a pipe.

In alternative embodiments, the housing may form a patch, which does not extend around the entire circumference of the pipe. The patch housing comprises four walls and a base to define an open cavity. Four contact surfaces are formed by the four ends of the walls distal from the base. The fastening means is operated to hold the patch and the four contact surfaces in a sealed engagement against the surface of a pipe. The fastening means may be any suitable fastening means such as, for example, a clasp, a ratchet and pawl, a belt and buckle, a rope and loop, a Velcro® strap or other strapping.

In yet another alternative embodiment the closure means may be closed by a motor. The fastening means may be operated to place the closure means in the initial closed position, whereupon a motor may be activated to close the closure means fully. The motor may be e.g. electric or hydraulically operated.

According to a particular embodiment of the invention there is provided an apparatus for sealing a leaking pipe, the apparatus comprising a tubular member and a clamp device; the tubular member comprising two tubular member portions opening about an axially extending hinged joint and closable in sealing interengagement with each other by operation of the clamp device; wherein each tubular member portion comprises axially spaced first and second ends each formed and arranged for sealing interengagement with a pipe when the tubular member portions are closed by the clamp device; and wherein at least one of the tubular member portions defines a cavity between itself and a pipe, in use of the apparatus.

Other embodiments and uses of the closure means are envisaged.

For example, the closure means 10 may be used to provide a permanent union between two sections of pipe.

Alternatively, the closure means 10 may be used in conjunction with electrical cables. The closure means 10 may be placed around damaged electrical cables to provide electrical isolation for protection and/or safety. This may prevent injury to people who may come in contact with any exposed wiring and prevent further damage to the cable. The internal cavity of the closure means advantageously does not force any exposed wires together.

Alternatively, the closure means 10 may be used in conjunction with a pipe that is not ruptured but is intact to provide protection to the pipe and prevent it being damaged or ruptured. Alternatively, the closure means may be placed around broken or damaged poles for temporary reinforcement. Alternatively, the closure means may be used in a thermosetting or electrofusion applications.

In further uses, the closure means may contain leaks by being fitted around: garden hoses; hydraulic pipes used in, for example, tractors or excavators; petrol pump hoses; and/or automobile radiator and/or brake pipes. This may allow a temporary repair of vehicles in remote locations.

Alternatively, the closure means may be used as a putty applicator whereby the cavity is filled with hardening putty and then placed around a ruptured section of pipe. The putty may then be left to harden before the closure means is released leaving the putty in situ to block any leaking fluid.

In alternative uses, the enclosed cavity may accommodate water treatment using a filter. For example, when the invention is used to join two open ended pipes, a filter may be located within the cavity that is able to capture particulate objects within the fluid supply. In some embodiments, the filter may be a magnetic filter capable of attracted and retaining magnetic metals. The closure means may be used in potable water systems.

In other embodiments the closure means of the invention may be adapted for use with pipe freezing, which may be used to isolate pipework water flow so work can be carried out on a system that has no isolation valves.

Also disclosed herein are closure means in which an access hole may be provided in an outer wall of the housing. Freeze spray may then be injected into the cavity when the closure means is fitted around a pipe. The closure means may therefore be used in this arrangement as a freeze spray application unit. Foam material may be placed in the cavity of the closure means to hold the freeze spray in close relation to the external surface of the pipe.

It is envisaged that in certain embodiments the closure means will be portable between pipework used in chemical systems and domestic heating and gas systems.

It is envisaged that devices disclosed herein may have uses or applications in the following areas:
  Domestic water/gas systems
  Commercial water/gas systems
  Waste and sewage systems
  Machines and appliances in factories to maintain them
  Cars, trucks and other vehicles
  Less developed countries or other areas where plumbers may be scarce
  Oil rigs and refineries etc.
  Air lines
  Hydraulic hoses
  Chemical plants
  Ships, submarines and other maritime machinery
  On steel and threaded pipework where it is difficult to repair pipes and replace joints
  Fire hoses and garden hoses Hospitals to maintain heating systems and to repair tubing connected to patients if accidentally punctured or there is a leaking fitting Public houses for repair of perforated tubing and pipework in draft systems Use on pipework in distilleries This specific description describes embodiments of the invention and is not limiting. Other embodiments of the invention will be conceivable by the skilled person without departing from the scope of the claims.

The invention claimed is:

1. A closure for containing fluid leaking from a ruptured pipe comprising:
    first and second housing members connected by a hinge and suitable for placing on a surface of a pipe to define an enclosed cavity between the first and second housing members and the surface of the pipe; and
    a clasp comprising a clasp arm and a linkage;
    wherein the clasp arm is coupled to the second housing member by the linkage;
    wherein the linkage is pivotally connected at a first end to the second housing member and at a second end to a pivot point on the clasp arm;
    wherein the clasp arm comprises a lever extending in a first direction away from the pivot point and a clasp latch integrally formed with the lever and extending in a second direction away from the pivot point substantially opposite to the first direction;
    wherein the clasp latch of the clasp arm engages with clasp arm retaining lips on the first housing member to hold the first and second housing members in a fully closed position;
    wherein in the fully closed position the linkage extends from the second housing member away from the clasp arm retaining lips, and the closure is in a sealed engagement with the pipe to produce a sealed joint therebetween;
    wherein the clasp latch of the clasp arm engages with the clasp arm retaining lips on the first housing member to hold the closure in an initial partially closed position; and
    wherein in the initial partially closed position the linkage extends from the second housing member towards the clasp arm retaining lips such that the clasp arm prevents the first housing member and the second housing member from opening and allows the first housing member and the second housing member to be moved along a length of the pipe.

2. The closure according to claim 1 wherein:
    the first housing member is arranged to engage with the second housing member to close about a section of a pipe; the first housing member comprises at least one cut-away portion in an outer wall thereof and the second housing member comprises at least one cut-away portion in an outer wall thereof, the cut-away portions arranged to cooperate to define at least one aperture in a wall of the at least one housing on engagement of the first housing member with the second housing member; and
    the clasp is operable to hold the first housing member in sealed engagement with the second housing member to produce a sealed joint therebetween.

3. The closure according to claim 2 wherein:
    the first and second housing members each comprise two cut-away portions; and
    the cut-away portions of the first housing member are arranged to cooperate with the cut-away portions of the second housing member to define two apertures in general register with each other in at least one wall of the at least one housing on engagement of the first housing member with the second housing member.

4. The closure according to claim 3 wherein the two apertures are coaxially aligned for accommodating a straight length of pipe passing through both apertures.

5. The closure according to claim 1 wherein the hinge comprises a removable hinge pin.

6. The closure according to claim 1 wherein the first and second housing members further comprise a first seal arranged to produce the sealed joint between the first and second housing members and the surface of the pipe.

7. The closure according to claim 6 further comprising a second seal located on at least one of the first and second housing members to produce the sealed joint between the first and second housing members.

8. The closure according to claim 7 wherein the first seal and the second seal are formed from a resiliently deformable material.

9. The closure according to claim 7 wherein the first and second seals are formed into a continuous seal.

10. The closure of claim 9 wherein the continuous seal is located about a periphery of at least one of the first and second housing members to prevent fluid leak.

11. The closure according to claim 1 wherein the clasp is fastened by operation of the lever.

12. The closure according to claim 11 wherein the lever provides a camming action.

13. The closure according to claim 11 wherein the lever is detachable.

14. The closure according to claim 1 wherein the clasp comprises a locking mechanism to retain the clasp in a fastened state.

* * * * *